United States Patent [19]

Taylor

[11] Patent Number: 5,530,232
[45] Date of Patent: Jun. 25, 1996

[54] MULTI-APPLICATION DATA CARD

[75] Inventor: Douglas C. Taylor, New York, N.Y.

[73] Assignee: Datamark Services, Inc., New York, N.Y.

[21] Appl. No.: 172,482

[22] Filed: Dec. 22, 1993

[51] Int. Cl.⁶ ..................................................... G06K 5/00
[52] U.S. Cl. ........................ 235/380; 235/379; 235/440; 235/492
[58] Field of Search ..................................... 235/379, 380, 235/492, 440

[56] References Cited

U.S. PATENT DOCUMENTS

| | | | |
|---|---|---|---|
| 4,382,279 | 5/1983 | Ugon | 364/200 |
| 4,443,027 | 4/1984 | McNeely et al. | 235/492 X |
| 4,451,701 | 5/1984 | Bendig | 179/2 TV |
| 4,480,178 | 10/1984 | Miller, II et al. | 235/380 |
| 4,563,575 | 1/1986 | Hoppe et al. | 235/492 |
| 4,581,484 | 4/1986 | Bendig | 179/2 DP |
| 4,614,861 | 9/1986 | Pavlov et al. | 235/380 X |
| 4,634,845 | 1/1987 | Hale et al. | 235/350 X |
| 4,683,372 | 7/1987 | Matsumoto | 235/380 X |
| 4,692,604 | 9/1987 | Billings | 235/493 |
| 4,695,805 | 9/1987 | Massingill et al. | 328/72 |
| 4,697,073 | 9/1987 | Hara | 235/487 |
| 4,700,055 | 10/1987 | Kashkashian, Jr. | 235/379 X |
| 4,701,601 | 10/1987 | Francini et al. | 235/380 X |
| 4,736,094 | 4/1988 | Yoshida | 235/379 |
| 4,766,293 | 8/1988 | Boston | 235/379 |
| 4,788,102 | 11/1988 | Koning et al. | 428/40 |
| 4,802,080 | 1/1989 | Bossi et al. | 363/75 |
| 4,874,935 | 10/1989 | Younger | 235/492 |
| 4,882,473 | 11/1989 | Bergeron et al. | 235/380 |
| 4,900,903 | 2/1990 | Wright et al. | 235/380 |
| 4,941,090 | 8/1990 | McCarthy | 364/405 |
| 4,961,142 | 10/1990 | Elliott et al. | 235/380 X |
| 4,982,072 | 1/1991 | Takigami | 235/384 |
| 4,992,651 | 2/1991 | Takahira | 235/492 |
| 5,003,520 | 3/1991 | Grieu et al. | 368/90 |
| 5,117,355 | 5/1992 | McCarthy | 364/405 |
| 5,122,643 | 6/1992 | Gamou et al. | 235/384 |
| 5,173,594 | 12/1992 | McClure | 235/380 |
| 5,191,193 | 3/1993 | Le Roux | 235/379 |
| 5,200,601 | 4/1993 | Jarvis | 235/492 |
| 5,220,501 | 6/1993 | Lawlor et al. | 364/408 |
| 5,276,311 | 1/1994 | Hennige | 235/380 |
| 5,287,268 | 2/1994 | McCarthy | 364/405 |

OTHER PUBLICATIONS

Three articles on smart cards, Automatic I.D. News, Dec. 1993, pp. 44 and 45.
"Diebold: Get Smart on Cards," Bank Systems+Technology, Nov. 1993, single page.
"Chemical Planning To Test an 'Intelligent' Debit Card," New York Times, Nov. 18, 1993, single page.
"Health 'Smart Cards' Get Jump in Oklahoma," Wall Street Journal, Nov. 24, 1993, single page.
"The Cashless Society," Information Week, Oct. 11, 1993, pp. 30, 31, 34, 36 and 40.
"Banks Plant the Seeds of Smart Card Success," Bank Technology News, vol. 6, No. 2, Feb. 1993, pp. 1, 11–14.
"At the Airport, Immigration Wants To See Your Palm," New York Times, Sep. 17, 1993, p. B5.
"The ticket to ride: Smart cards," USA Today, Jan. 11, 1994, two pages.
"A Toll Collector on the Information Highway," New York Times, Aug. 22, 1993, p. 8.

Primary Examiner—Donald T. Hajec
Assistant Examiner—Michael G. Lee
Attorney, Agent, or Firm—Donald S. Dowden

[57] ABSTRACT

A multi-application data card is capable of substituting for a plurality of existing single-application data cards. The multi-application data card can be a smart card comprising a memory formed with at least three memory banks or storage areas for storing and updating data relating respectively to at least one authorized holder of the card and at least two authorized applications of the card. Alternatively, the data card can be a conventional card having a magnetic stripe, and the memory functions can be performed at a location remote from the card reader and connected thereto by a data link. In addition, the data card can comprise both a magnetic stripe and solid-state circuitry so that it can be read by a card reader compatible with a magnetic-stripe card or by a card reader compatible with a smart card. In accordance with the invention, a card holder needs to carry just one card for all card uses, both financial and non-financial.

7 Claims, 5 Drawing Sheets

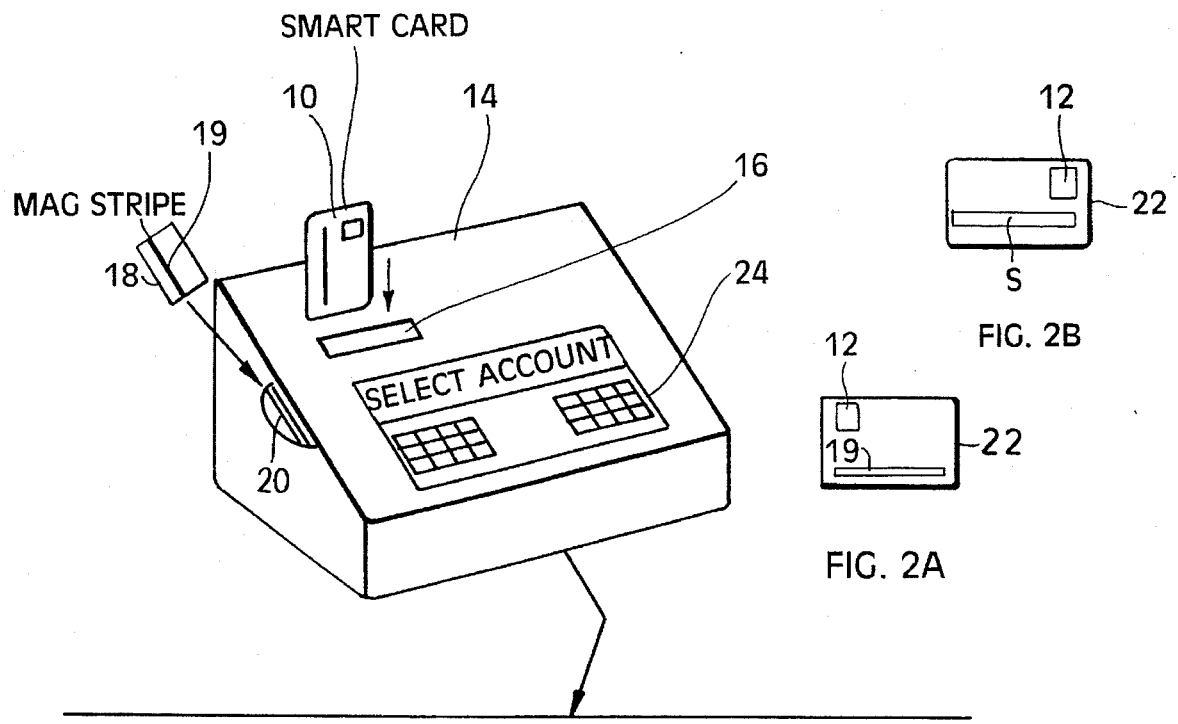
FIG. 2B
FIG. 2A
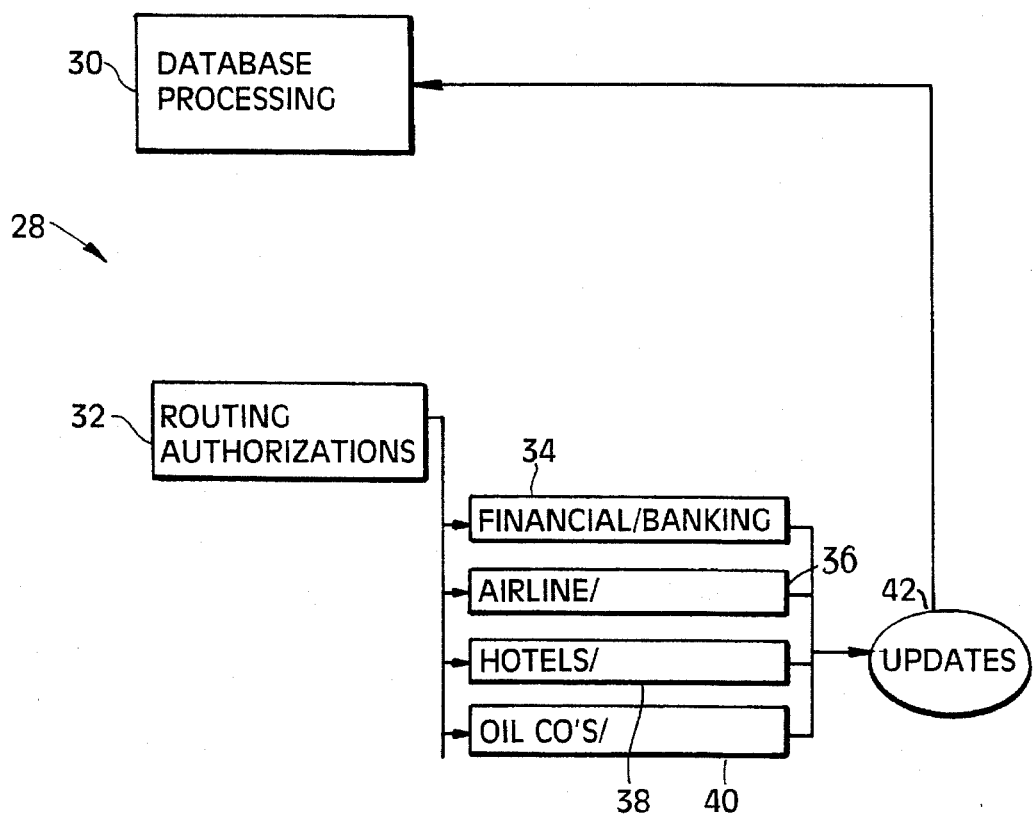
FIG. 2

MULTI-APPLICATION DATA CARD

BACKGROUND OF THE INVENTION

1. Field of the Invention

This invention relates to data cards and, more particularly, to a multi-application data card capable of substituting for a plurality of existing single-application data cards and to a system and method of employing the card.

2. Description of the Prior Art

The generic term "data card" includes not only all kinds of financial cards but also various other cards that contain non-financial data. The term "financial card" includes credit cards, debit cards, A.T.M. cards and other cards that contain financial data. From another standpoint, data cards include, to cite only a few examples, oil company cards, department store cards, car rental cards, hotel cards and airline cards.

Data cards are now ubiquitous; their use has proliferated to such an extent that users of the cards find it objectionable and burdensome to carry all that seem to be required if one is to function in modern society.

Attempts have been made in the past to remedy the problem of card proliferation. For example, certain issuers of "general-purpose" credit cards (e.g., American Express, Visa, Master Charge) have prevailed upon many establishments, including those such as department stores, oil companies, airlines and car rental companies that issue their own credit cards, to accept the general-purpose credit card in addition to the card separately issued by the department store, oil company, etc. Also, there are co-branded cards. Even so, there is no single credit card that is universally accepted, and it is not foreseeable that any single issuer of credit cards, such as American Express, Visa, Master Charge, etc., is ever likely to become totally dominant or universally accepted.

Moreover, there are now available and in general use not only credit cards but also debit cards and various other financial-transaction cards, plus data cards and forms, often not machine-readable, for drivers' licenses, building security, insurance purposes, personal identification, etc.

Within a given data card category, there may be magnetic-stripe cards and so-called "smart" cards. The magnetic-stripe cards, which are in general use, have limited capabilities. The smart cards are not yet in such wide use but show great promise because of their superior capabilities. The two types of cards require different types of readers. Smart cards are in fact of at least two types: those employing electrical contacts and the so-called "contactless" smart cards. The latter are read in an A.T.M. or point-of-sale terminal by means of a field; no electrical contacts are required for reading the card.

There is a great need, which has not heretofore been met, for a substitute, replacement, or consolidation card allowing multiple card issuers to be represented within a single data card and allowing consumers to carry just one card for all types of transactions, including those listed above and others.

There is also a need to enable vendors individually or collectively to award points for frequency use and to track the awards efficiently. The current system of awarding airline bonus mileage, for example, is cumbersome, requiring a passenger to verbally advise a ticket agent of his frequent-flyer number at the time of ticketing and requiring the airline to prepare periodic reports to advise the passenger of the current status of his bonus account.

There is also a need to eliminate the cumbersome and annoying coupon system employed by supermarkets and similar stores. Consumers object to being made to clip coupons, often provided in the store or in newspapers, in order to obtain discounts. It would be very desirable to substitute a system that automatically kept track of purchases and awarded discounts or coupon equivalents automatically depending upon current purchases and/or history of purchases, broken down by brand and in other ways.

Clearly, the promise of the so-called cashless society has been delayed because of the lack of a suitable means for implementing it.

OBJECTS AND SUMMARY OF THE INVENTION

An object of the invention is to remedy the problems of the prior art outlined above. In particular, an object of the invention is to provide a multi-application data card capable of substituting for a plurality of (indeed all) existing single-application data cards, whether or not they are co-branded.

Another object of the invention is to provide a system comprising at least one multi-application data card and at least one card reader constructed so that a single data card can be substituted for a plurality of existing single-application data cards.

Another object of the invention is to provide a process employing at least one multi-application data card and at least one card reader and comprising steps that enable a multi-application data card to be substituted for a plurality of existing single-application data cards.

Another object of the invention is to provide a single data card that can be carried by everyone, so that everyone need carry one card and one card only.

The foregoing and other objects are attained in accordance with the invention by providing a multi-application data card capable of substituting for a plurality of existing signal-application data cards and comprising memory means formed with at least three memory banks or storage areas for storing and updating data relating respectively to at least one authorized holder of the card and at least two authorized applications of the card.

In accordance with an independent aspect of the invention, there is provided a multi-application data card capable of substituting for a plurality of existing single-application data cards and comprising a magnetic stripe for reading by a card reader compatible with a magnetic-stripe card and solid-state circuitry for reading by a card reader compatible with a smart card.

In accordance with an independent aspect of the invention, there is provided a system comprising at least one multi-application data card, at least one card reader, and memory means formed with at least three memory banks or storage areas for storing and updating data relating respectively to at least one authorized holder of the card and at least two authorized applications of the card. The reader comprises first data port means (input means) enabling the holder to select one of the applications and second data port means (including a bus or line for data transfer accessing two of the memory banks, one of the accessed memory banks containing data relating to the holder and the other of the accessed memory banks containing data relating to the selected application.

If the card is a smart card, the memory means is located at least in part on the card.

If the card is a magnetic-stripe card, the memory means is located at least in part remotely from the reader and connected thereto by a data link.

In accordance with another independent aspect of the invention, there is provided a process employing at least one multi-application data card and at least one card reader. The process comprises the steps of forming at least three memory banks for storing and updating data relating respectively to at least one authorized holder of the card and at least two authorized applications of the card. First data port means is provided on the reader enabling the holder to select one of the applications and second data port means is provided for accessing two of the memory banks. One of the accessed memory banks contains data relating to the holder and the other of the accessed memory banks contains data relating to the selected application.

BRIEF DESCRIPTION OF THE DRAWINGS

A better understanding of the objects, features and advantages of the invention can be gained from a consideration of the following detailed description of the preferred embodiments thereof, wherein:

FIG. 2 is a diagrammatic representation of a system in accordance with the invention compatible with both smart cards and magnetic-stripe cards;

FIG. 2A is a representation of a card in accordance with the invention that is constructed as both a smart card and a magnetic-stripe card;

FIG. 2B is a representation of the reverse side of a card in accordance with the invention showing a space for the signature of the card holder;

DESCRIPTION OF THE PREFERRED EMBODIMENTS

Figure 1:
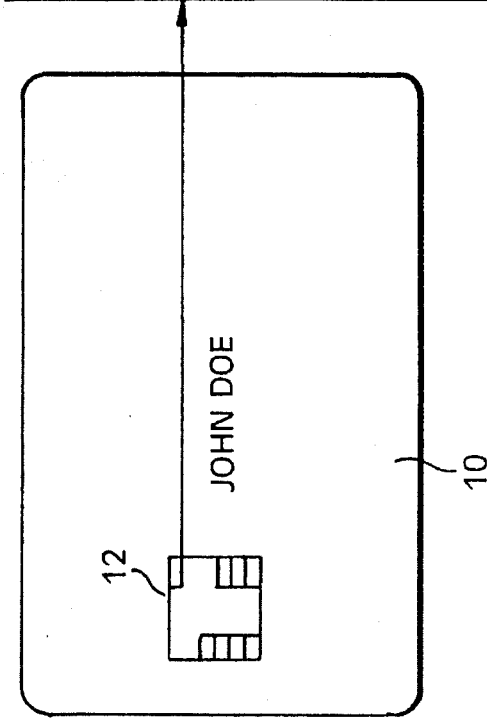
FIG. 1 is a schematic diagram of a multi-application data card of the smart-card type illustrating financial and other records contained thereon.

FIG. 1 shows a multi-application data card 10 conveniently formed of plastic and containing solid-state circuitry represented schematically at 12 and the name of the authorized card holder. The card 10 is a smart card, and the solid-state circuitry 12 includes a microprocessor and memory chips embedded within the card. The memory chips hold the equivalent of several typewritten pages of information. An example of some of the data recorded on the card is shown in FIG. 1. Thus a number of applications, including American Express, Visa, Master Charge, Discovery, various oil companies, various hotels, and various airlines, may be recorded together with a PIN (personal identification number), the account number, expiration date, account (or access or vendor) code, and various records for each of the separate accounts, plus miscellaneous data. The account, access or vendor code is a special code of each vendor which lets that vendor alone change data on the vendor's portion of the card. The records column includes, for example, frequency data, bonus point tie-ins with multiple vendors, etc. The miscellaneous column is for whatever additional data a particular vendor may wish to record.

In FIG. 1, the card 10 may have information printed or embossed, on its face in addition to the name of the card holder. For example, this information may include the address and possibly other information such as the social security number and telephone number of the card holder. The same information can alternatively or additionally be provided in a memory chip embedded in the card 10. This information is available to all: the card holder herself, of course, as well as any vendor to whom the card is presented. Thus this information, without access to the additional information represented in FIG. 1, is sufficient for many purposes, such as awarding coupons to consumers who indicate certain preferences via interactive T.V.

FIG. 2 shows the smart card 10 interacting with a card reader/writer 14 (hereinafter referred to as a card reader for short). The card reader 14 is capable of reading not only the smart card 10, which is inserted into a slot 16, but also a conventional magnetic-stripe card 18, which is inserted into a slot 20. The card reader is capable of writing on a cooperating smart card to update various records thereon. In the case of a magnetic-stripe card, the updating of the records is done at a remote location, as explained below.

As FIG. 2A shows, it is possible to combine the smart card 10 and magnetic-stripe card 18 into a single multi-application card 22 having a magnetic stripe 19 for reading by a card reader compatible with a magnetic-stripe card and solid-state circuitry 12 for reading by a card reader compatible with a smart card. FIG. 2B shows the reverse side of the card shown in FIG. 2A, including a signature space S. The card reader may combine both reading functions in a single unit, as illustrated in FIG. 2, or separate card readers may be provided, one for reading magnetic-stripe cards and another for reading smart cards.

Other examples, which need not be illustrated in the drawing, include duty-free shops, cruise lines, traveller's checks, ticketing, T.V. cable/satellite box (interactive), health care, telephone, foreign currency applications, vending machines, keys, driver's license, insurance data, passport, voice, fingerprint, signature and supermarkets. Not only credit transactions but also debit transactions and non-financial transactions are within the scope of the invention.

In any case, the card reader includes first data port means enabling the holder of the card to select a particular application such as American Express, Visa, etc. The first data port means includes for example a keypad 24 by which the holder of the card selects the desired application.

In accordance with the invention, at least three memory banks or storage areas are formed for storing and updating data relating respectively to at least one authorized holder of the card and at least two authorized applications of the card. If the card is a smart card, the memory is located at least in part on the card. On the other hand, if the card is a magnetic-stripe card, the memory is located at least in part remotely from the reader and connected thereto by a data link.

In FIG. 2, the reader 14 is connected by a data link represented schematically at 26 to a remote location 28 including data base processing apparatus 30. The processing apparatus 30 can include a mainframe computer and peripheral equipment for receiving and processing information not only from the reader 14 but from numerous similar readers at various locations.

Routing authorizations are controlled by circuitry 32 that continuously "talks" to the data base processing circuitry 30. These routing authorizations include financial/banking, airlines, hotels, oil companies, etc., as indicated schematically in FIG. 2 at 34, 36, 38 and 40 (here as elsewhere in this disclosure, the listing is intended to be merely illustrative or exemplary and by no means exhaustive). Updates of the information based on the transactions initiated at the reader 14 and similar readers are processed by circuitry 42 and fed back to the circuitry 30. Depending on the transaction, the smart card 10 employed to authorize the transaction can be updated as a result of the transaction. The steps disclosed above can easily be implemented by those skilled in the art upon consideration of this disclosure.

Figure 3:
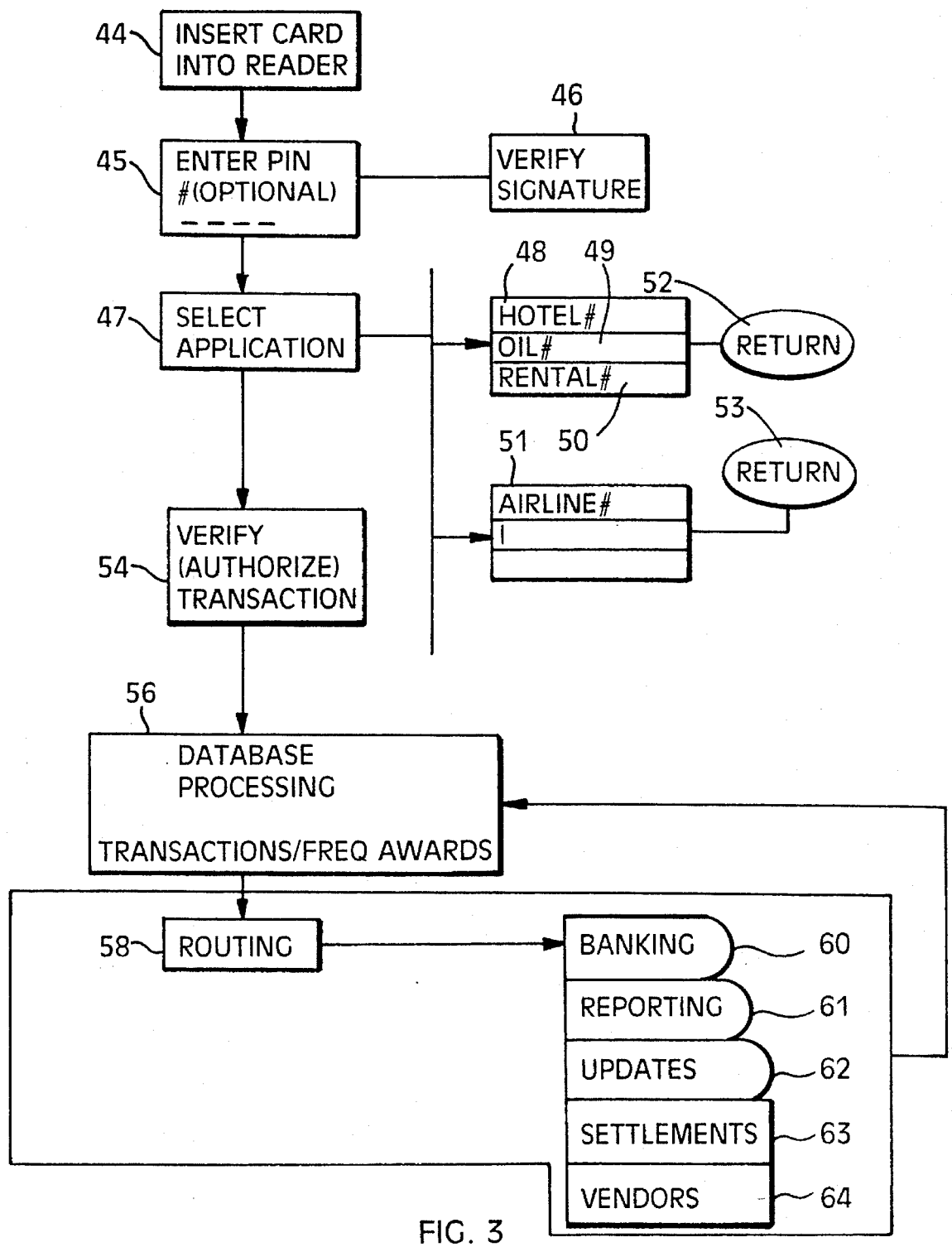
FIG. 3 is a high-level multiple card system software diagram.

FIG. 3 explains the operation of the system in greater detail. The card is inserted into the reader at 44, and a personal identification number or PIN number is optionally entered at 45. A signature (or voiceprint, etc.) can optionally be verified at 46. At step 47, the desired application is selected using the input device (keypad, trackball, etc.) provided on the reader. The application can be a particular hotel, oil company, rental company, or airline as indicated at 48, 49, 50 and 51, or a combination of them. When the desired application has (or applications have) been selected, it is (they are) entered by pressing a return key 52 or 53 or in any other convenient manner, as those skilled in the art will readily understand.

Figure 5:
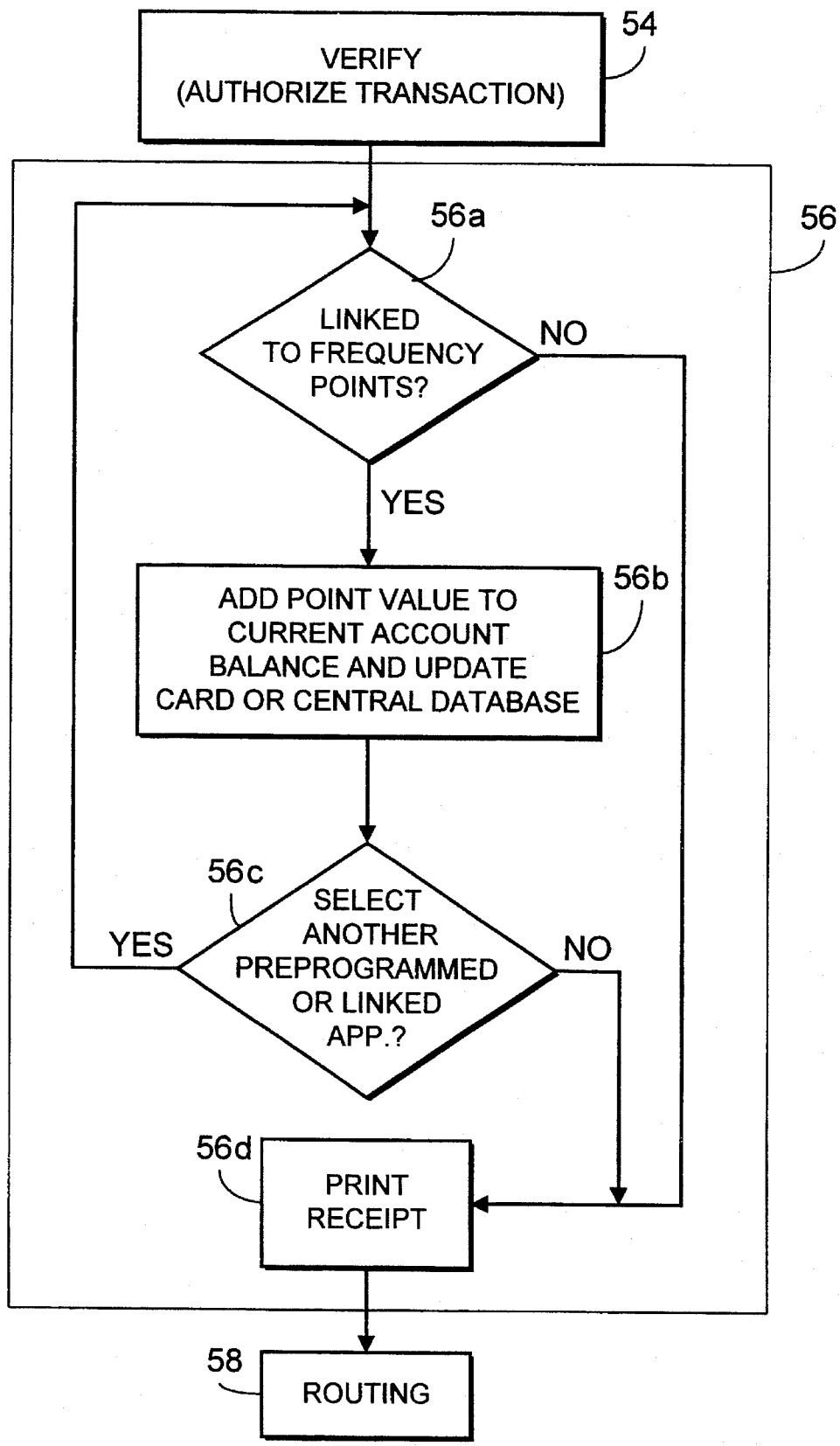
FIG. 5 is a flow chart showing a portion of the software illustrated in FIG. 3.

The transaction is verified or authorized at 54, and the data base processing is performed at 56. FIG. 5 illustrates some of the processing performed at 56. At step 56a a determination is made whether a particular transaction is linked to frequency points (e.g., the purchase of an airline ticket may be linked to bonus miles). If so, at 56b the point value is added to the current account balance and the card or central database is updated. At step 56c, a determination is made whether another preprogrammed or linked application is selected. If so, the program loops back to step 56a. If not, a receipt is printed at step 56d, and the program proceeds to step 58 (FIG. 3). If it is determine at step 56a that the selected transaction is not linked to frequency points, the program skips steps 56b and 56c and proceeds directly to step 56d. This processing includes recording and updating of transactions, the calculation and storing in memory of frequency awards such as frequent-flyer mileage, which of course is linked to the purchase of an airline ticket quantity discounts, which are linked to the purchase of specified quantities of specified goods, and any other processing that may be called for in view of the selected application and the nature of the transaction.

Routing circuitry 58 routes the processed data to appropriate memory locations relating to banking, reporting, updates, settlements, vendors, etc., as indicated schematically at 60, 61, 62, 63 and 64. Updated data from these various locations is supplied back to the memory in the data processing circuitry 56 and if appropriate to the card reader for updating data stored on the holder's card.

Figure 4:
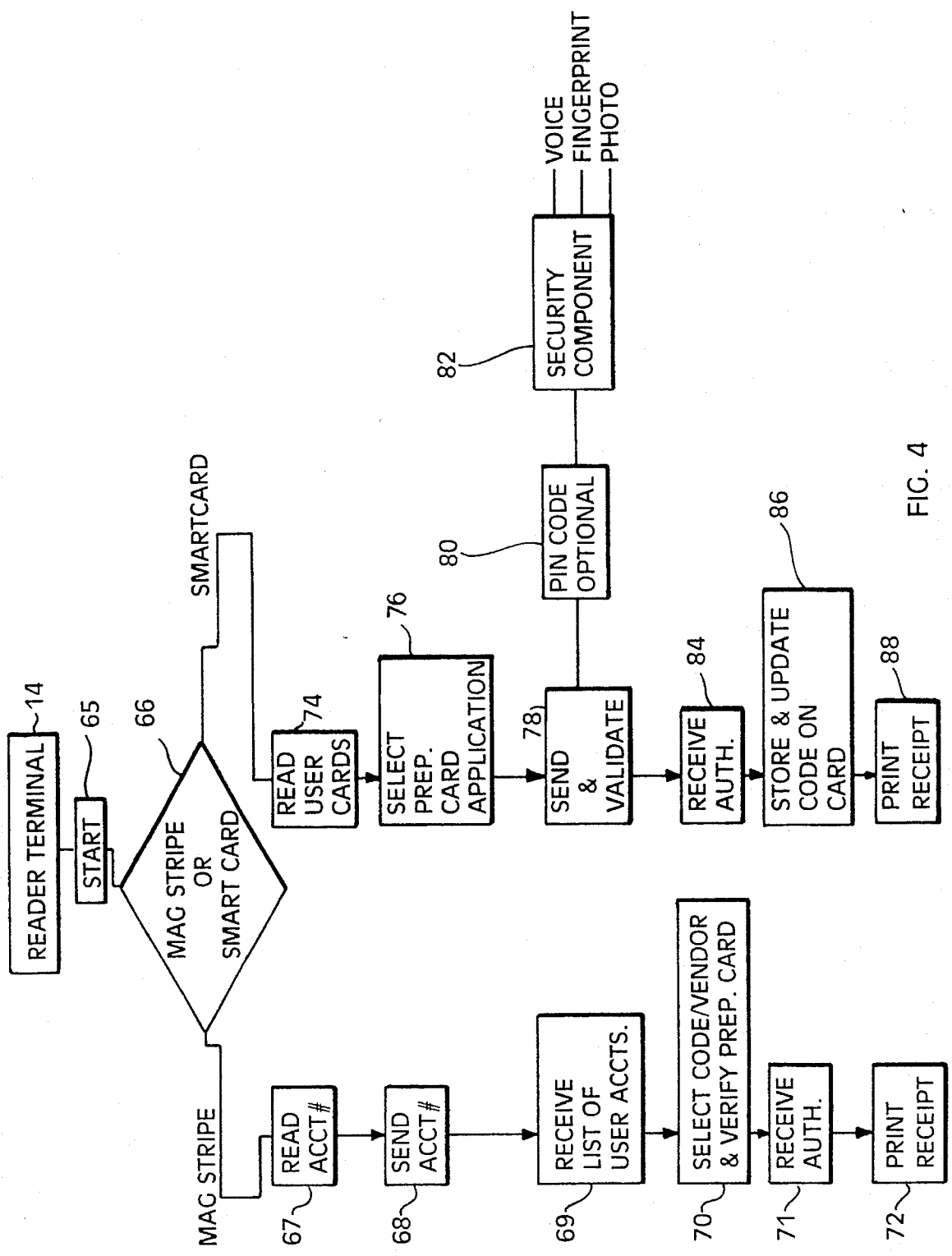
FIG. 4 is an example of software associated with a reader terminal.

FIG. 4 indicates how a single reader terminal 14 can process both magnetic-stripe cards and smart cards. After the start of the program at 65, a determination is made at 66 whether the inserted card is a magnetic-stripe card or a smart card. If it is a magnetic-stripe card, the account number is read at 67 and transmitted at 68. A list of user accounts (applications) is provided at 69, and one is selected and verified at 70. Authorization is received at 71, and a receipt is printed at 72.

If at step 66 it is determined that the inserted card is a smart card, then it is read at 74, and the preferred card application is selected at 76. It is sent and validated at step 78. A personal identification number or PIN code is optionally employed at 80, and a security component such as a voiceprint, a fingerprint, or a photograph (or a signature, etc.) is employed at 82. Authorization is then received at 84, and data on the smart card is updated and stored at 86. A receipt is printed at 88.

In case of use of a card constructed in accordance with the invention as a credit card, there can be a predetermined credit card company that is specified by default unless the user specifies a different company. Similar defaults can be provided with respect to other choices offered the holder of the card.

It is also possible in accordance with the invention for one company, such as American Express, to issue a card and to rent space on the card to another company, such as Visa, and/or to make a transaction charge for use of the card to execute a transaction with that other company.

A card in accordance with the invention never needs to be reissued; for example, the expiration date for each separate application can be updated from time to time as the card is used, and the card holder can use the same card for a lifetime.

Preferably, a smart card is employed in accordance with the invention. A smart card can have higher transaction limits without the need to utilize data links because a smart card offers better security. It thus enables transactions to be pre-approved. The smart card can from another standpoint be self-authenticating; the system can be constructed so that, as to certain transactions, there is no need to obtain clearance at a central location. Avoidance of the use of data links saves money and time. The improved security provided by a smart card used in accordance with the invention will reduce fraud and provide issuer savings.

When the card is used as a frequency card, tie-ins or links, for example between different applications such as American Express, Hyatt Hotels, United Airlines and Hertz, can easily be made.

The card is suitable for both business and personal use. If airline mileage is tracked, for example, and bonus mileage, which is linked thereto, is awarded, it can be used instantaneously if recorded on the card, simply by presenting the card to a card reader and entering the appropriate instructions. This reduces the expense of mailings every time a transaction occurs.

The card can be used in one of its applications as a cash card with a stored cash value, thereby avoiding the need to purchase traveler's checks. This can be done in multiple currencies, thus saving travellers from carrying multiple foreign currencies.

The card in any of its applications can be encrypted for security, using any conventional encryption system.

Digitally encrypted sound and video signals can be recorded on the card, providing for both sound and a visual display in association with a suitable terminal, as those skilled in the art will readily understand.

The card can interact with a computer (P.C., laptop, palmtop, pocket, etc.), with "Personal Computer Memory Card" slots to provide calendar, date book and checkbook information. With an adaptor, smart cards can be used in the PCMC slot and be read and written to. The card user can then use a computer to access the data on the card (and modify certain data). If the computer has a modem, it becomes a terminal whereby transactions can be made. In addition, there are telephones with reading and writing functions that can be adapted for use in accordance with the invention. Other devices that can perform reading and writing functions can also be employed.

The card can be used for mass transit, since it can have a stored value that is debited with each use.

There is no limit to the data relating to the holder that can be provided on the card, except whatever limit is imposed by memory capacity. For example, these data can be selected from the group consisting of medical records of said holder; insurance records of said holder; a driver's license of said holder; a passport of said holder; financial records of said holder; a digitized fingerprint of said holder; a digitized voiceprint of said holder; a security code of said holder; and commercial-bonus points of said holder.

Similarly, there is no limit on the data relating to the applications, except the limit imposed by the memory capacity of the card. For example, these data can be selected from the group consisting of a credit transaction of said holder; a debit transaction of said holder; a health-care transaction of said holder; an insurance transaction of said holder; a commercial-bonus-points transaction of said holder; an airline ticketing transaction of said holder; a train ticketing transaction of said holder; a bus ticketing transaction of said holder; a ship ticketing transaction of said holder; and a theater ticketing transaction of said holder.

Thus there is provided in accordance with the invention a novel and highly effective multi-application data card capable of substituting for a plurality of existing single-application data cards, a system in which the card can be employed and applications prioritized, and a process of employing the card. Many modifications and extensions of the preferred embodiments of the invention disclosed above will readily occur to those skilled in the art. Accordingly, the invention is to be construed as including all embodiments thereof that fall within the scope of the appended claims.

I claim:

1. A system comprising at least one multi-application data card, at least one card reader, and memory means formed with at least three storage areas for storing data relating respectively to at least one authorized holder of said card and at least two authorized applications of said card;

said reader comprising input means enabling said holder to select a first of said applications and means for accessing all of said storage areas, a first of said accessed storage areas containing data relating to said holder, a second of said accessed storage areas containing data relating to said selected first application, and the third of said accessed storage areas containing data relating to said second application, said first and second applications being linked and said memory means being responsive to a transaction using said card and involving said selected first application for modifying data relating to said second application.

2. A system according to claim 1 wherein said card is a smart card and said memory means is located at least in part on said card.

3. A system according to claim 1 wherein said card is a magnetic-stripe card and said memory means is located at least in part remotely from said reader and connected thereto by a data link.

4. A system according to claim 1 wherein said data card comprises a magnetic stripe for reading by a card reader compatible with a magnetic-stripe card and solid-state circuitry for reading by a card reader compatible with a smart card and wherein said reader is adapted to read both a magnetic-stripe card and a smart card.

5. A system according to claim 1 wherein said reader is formed with a slot and reads said card when said card is inserted into said slot.

6. A system according to claim 1 wherein said reader reads said card when said card is in proximity to said reader.

7. A process employing at least one multi-application data card and at least one card reader and comprising the steps of forming at least three memory storage areas for storing data relating respectively to at least one authorized holder of said card and at least two authorized applications of said card, and providing input means on said reader enabling said holder to select a first of said applications and means accessing all of said memory storage areas, a first of said accessed storage areas containing data relating to said holder, a second of said accessed storage areas containing data relating to said selected first application, and the third of said accessed storage areas containing data relating to said second application, said first and second applications being linked and said memory storage areas being responsive to a transaction using said card and involving said selected first application for modifying data relating to said second application.

* * * * *